(12) United States Patent  (10) Patent No.: US 11,741,997 B2
Han et al.  (45) Date of Patent: Aug. 29, 2023

(54) METHOD, DEVICE AND SYSTEM FOR GENERATING MEDIA PLAYBACK SEQUENCE

(71) Applicant: XI'AN NOVASTAR TECH CO., LTD., Shaanxi (CN)

(72) Inventors: Dan Han, Shaanxi (CN); Huorong Wang, Shaanxi (CN); Jingguo Zong, Shaanxi (CN); Lai Xin, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 6 days.

(21) Appl. No.: 17/043,730

(22) PCT Filed: Feb. 28, 2019

(86) PCT No.: PCT/CN2019/076513
§ 371 (c)(1),
(2) Date: Sep. 30, 2020

(87) PCT Pub. No.: WO2020/172858
PCT Pub. Date: Sep. 3, 2020

(65) Prior Publication Data
US 2021/0383842 A1 Dec. 9, 2021

(51) Int. Cl.
*G11B 27/10* (2006.01)
*G11B 27/34* (2006.01)

(52) U.S. Cl.
CPC .......... *G11B 27/102* (2013.01); *G11B 27/34* (2013.01)

(58) Field of Classification Search
CPC .............................. G11B 27/102; G11B 27/34
See application file for complete search history.

(56) References Cited

U.S. PATENT DOCUMENTS

2002/0072973 A1 6/2002 Rosenman
2008/0103893 A1 5/2008 Nagarajan et al.

FOREIGN PATENT DOCUMENTS

| CN | 1377149 A | 10/2002 |
| CN | 101742274 A | 6/2010 |
| CN | 103533397 A | 1/2014 |
| CN | 104025609 A | 9/2014 |
| CN | 106162253 A | 11/2016 |

*Primary Examiner* — Mishawn N. Hunter
(74) *Attorney, Agent, or Firm* — Gang Yu

(57) ABSTRACT

The embodiments of the present disclosure disclose a media method, device and system for generating a media playback sequence. The method includes acquiring a plurality of media identifiers respectively corresponding to a plurality of media, and media playbacks times respectively corresponding to the plurality of media identifiers; comparing a maximum media playbacks time among the media playbacks times with a sum of remaining media playbacks times to obtain a determination result; and selecting, according to the determination result, one of a plurality of different generation methods to generate a media playback sequence for a media player to use to play the plurality of media back, wherein the media playback sequence includes the plurality of media identifiers, and the number of each of the media identifiers in the media playback sequence is equal to the media playbacks time corresponding to each of the media identifiers.

17 Claims, 6 Drawing Sheets

| ▫ Thumbnail | Media identifier | Detailed information | Number of media playbacks |
|---|---|---|---|
| ▫ ▭ | A | Duration: 00:00:07 | 4 |
| ▫ ▭ | B | Duration: 00:00:20 | 4 |
| ▫ ▭ | C | Duration: 00:00:30 | 8 |
| ▫ ▭ | D | Duration: 00:01:08 | 6 |
| ▫ ▭ | E | Duration: 00:01:20 | 2 |

Figure 3

| C | C | C | C |
|---|---|---|---|

Figure 4A

| CA | C | CA | C |
|---|---|---|---|

Figure 4B

| CA | CB | CA | CB |
|---|---|---|---|

Figure 4C

| CA | CB | CAE | CB |
|---|---|---|---|

Figure 4D

| CAD | CBD | CAE | CBD |
|---|---|---|---|

Figure 4E

| CAD | CBD | CAE | CBD | CAD | CBD | CAE | CBD |
|---|---|---|---|---|---|---|---|

METHOD, DEVICE AND SYSTEM FOR GENERATING MEDIA PLAYBACK SEQUENCE

TECHNICAL FIELD

The present disclosure relates to the technical field of media playback, and in particular, to a method for generating a media playback sequence, a device for generating a media playback sequence, a system for generating a media playback sequence, and a computer readable storage medium.

BACKGROUND

In the LED display industry, a user often needs to make a playback list, adds a plurality of media to the playback list, and sets different playbacks time for each media, to make full use of a current display screen to complete promotion and exhibition of a commercial advertisement of the user.

However, the playback order of media, is not just sequentially playing one piece of media back according to the playbacks time of the piece of media back, and then playing another piece of media back, and more often, the media needs to be sorted uniformly and then played back sequentially. Therefore, how to achieve uniform sorting of a plurality of media in a list is a technical problem to be solved at present.

SUMMARY

In one aspect, a method for generating a media playback sequence provided in an embodiment of the present disclosure includes steps of: (a) a plurality of media identifiers respectively corresponding to a plurality of media, and media playbacks times respectively corresponding to the plurality of media identifiers are acquired; (b) a maximum media playbacks time among the media playbacks times is compared with a sum of remaining media playbacks times to obtain a determination result; and (c) according to the determination result, one of a plurality of different generation methods is selected to generate a media playback sequence for a media player to use to play the plurality of media back, wherein the media playback sequence includes the plurality of media identifiers, and the number of each of the media identifiers in the media playback sequence is equal to the media playbacks time corresponding to each of the media identifiers.

In an embodiment of the present disclosure, the step (c) includes: (c1) if the determination result is that the maximum media playbacks time is smaller than or equal to the sum of the remaining media playbacks times, a first generation method from the plurality of different generation methods is selected to generate the media playback sequence, wherein the first generation method includes:

a maximum common divisor of the media playbacks times is acquired, and a plurality of quotients are acquired by dividing the media playbacks times by the maximum common divisor respectively to obtain a first object array associating the plurality of media identifiers with the plurality of quotients;

according to the magnitude of the plurality of quotients, the first object array is sorted to obtain a sorted object, array;

a media identifier having a maximum quotient in the sorted object array is used to perform segmentation occupation to obtain a plurality of initial segments;

media identifiers, of which the quotients divide exactly into the maximum quotient, in the sorted object, array are acquired to form a first media identifier sequence;

media identifiers, of which the quotients do not divide exactly into the maximum quotient, in the sorted object array are acquired to form a second media identifier sequence;

according to the first media identifier sequence and the second media identifier sequence, initial insertion positions, in the plurality of initial segments, of the remaining media identifiers except the media identifier with the maximum quotient in the sorted object array are determined;

according to the maximum quotient, the quotients of the remaining media identifiers in the sorted object array and the initial insertion positions of the remaining media identifiers in the plurality of initial segments, the insertion positions of the remaining media identifiers in the plurality of initial segments are determined to obtain a plurality of target segments including the plurality of media identifiers, wherein the total number of each of the plurality of media identifiers in the plurality of target segments is equal to the quotient of each of the plurality of media identifiers in the sorted object array; and the media playback sequence is obtained according to the plurality of target segments and the maximum common divisor.

In an embodiment of the present disclosure, the step (c) includes: (c2) if the determination result is that the maximum media playbacks time is greater than the sum of the remaining media playbacks times and conditions that the number of the plurality of media identifiers is equal to 2 and a minimum media playbacks time among the media playbacks times is 1 are satisfied, a second generation method from the plurality of different generation methods is selected to generate the media playback sequence, wherein the second generation method includes:

a second object array associating the plurality of media identifiers with the media playbacks times is generated;

a sum of the media playbacks times is calculated, and a plurality of segments is generated, the number of which is equal to the sum;

a quotient obtained by dividing the sum by 2 is rounded down to determine a target position, in the plurality of segments, of the media identifier having the minimum media playbacks time; and the media identifier having the minimum media playbacks time is inserted into a target segment, corresponding to the target position in the plurality of segments, and remaining media identifiers in the plurality of media identifiers are inserted into the remaining segments, except the target segment in the plurality of segments to obtain the media playback sequence.

In an embodiment of the present disclosure, the step (c) includes: (c3) if the determination result is that the maximum media playbacks time is greater than the sum of the remaining media playbacks times and the conditions that the number of the plurality of media identifiers is equal to 2 and the minimum media playbacks time among the media playbacks times is 1 are not satisfied, a third generation method from the plurality of different generation methods is selected to generate the media playback sequence, wherein the third generation method includes:

according to the magnitude of the media playbacks times, the media playbacks times are sorted to obtain a third object array associating the plurality of media identifiers and the media playbacks times;

a sum of the media playbacks times is calculated, and a two-dimensional array is generated, the length of which is equal to the sum; and the plurality of media identifiers in the third object array are sequentially used as media identifiers to be inserted and the media identifiers to be inserted are inserted into the two-dimensional array, to obtain the media playback sequence, specifically including:

the number of empty arrays in the two-dimensional array is acquired to obtain an acquisition result, and a position object array for recording the positions of the empty arrays in the two-dimensional array is generated; and according to the acquisition result and the media playbacks time of each of the media identifiers to be inserted, the insertion positions of the media identifiers to be inserted in the two-dimensional array are calculated.

In another aspect, a device for generating a media playback sequence provided in an embodiment of the present disclosure includes: an acquisition module, configured to acquire a plurality of media identifiers corresponding to a plurality of media, and media playbacks times respectively corresponding to the plurality of media identifiers; a determination module, configured to compare a maximum media playbacks time among the media playbacks times with a sum of remaining media playbacks times to obtain a determination result; and a generation module, configured to select, according to the determination result, one of a plurality of different generation methods to generate a media playback sequence for a media player to use to play the plurality of media back, wherein the media playback sequence includes the plurality of media identifiers, and the number of each of the media identifiers in the media playback sequence is equal to the media playbacks time corresponding to each of the media identifiers.

In an embodiment of the present disclosure, the generation module includes a plurality of generation units and a selection unit, wherein the plurality of generation units are configured to provide the plurality of different generation methods respectively, and the selection unit is configured to select, according to the determination result, one of the plurality of generation units to generate the media playback sequence.

In an embodiment of the present disclosure, the plurality of generation units include a first generation unit, and the first generation unit is configured to:

acquire a maximum common divisor of the media playbacks times, and acquire a plurality of quotients by dividing the media playbacks times by the maximum common divisor respectively to obtain a first object array associating the plurality of media identifiers with the plurality of quotients;

sort the first object array according to the magnitude of the plurality of quotients to obtain a sorted object array;

use a media identifier having a maximum quotient in the sorted object array to perform segmentation occupation to obtain a plurality of initial segments;

acquire media identifiers, of which the quotients divide exactly into the maximum quotient, in the sorted object array to form a first media identifier sequence;

acquire media identifiers, of which the quotients do not divide exactly into the maximum quotient, in the sorted object array to form a second media identifier sequence;

according to the first media identifier sequence and the second media identifier sequence, determine initial insertion positions, in the plurality of initial segments, of the remaining media identifiers except the media identifier having the maximum quotient in the sorted object array;

according to the maximum quotient, the quotients of the remaining media identifiers in the sorted object array and the initial insertion positions of the remaining media identifiers in the plurality of initial segments, determine the insertion positions of the remaining media identifiers in the plurality of initial segments to obtain a plurality of target segments including the plurality of media identifiers, wherein the total number of each of the plurality of media identifiers in the plurality of target segments is equal to the quotient of each of the plurality of media identifiers in the sorted object array; and obtain the media playback sequence according to the plurality of target segments and the maximum common divisor.

In an embodiment of the present disclosure, the plurality of generation units further include a second generation unit, and the second generation unit is configured to:

generate a second object, array associating the plurality of media identifiers with the media playbacks times;

calculate a sum of the media playbacks times, and generate a plurality of segments, the number of which is equal to the sum;

round down a quotient obtained by dividing the sum by 2 to determine a target position in the plurality of segments, of the media identifier having the minimum media playbacks time; and insert the media identifier having the minimum media playbacks time into a target segment, corresponding to the target position, in the plurality of segments, and insert remaining media identifiers in the plurality of media identifiers into the remaining segments, except the target segment, in the plurality of segments to obtain the media playback sequence.

In an embodiment of the present disclosure, the plurality of generation units further include a third generation unit, and the third generation unit is configured to:

sort the media playbacks times according to the magnitude of the media playbacks times to obtain a third object array associating the plurality of media identifiers and the media playbacks times;

calculate a sum of the media playbacks times, and generate a two-dimensional array, the length of which is equal to the sum; and sequentially use the plurality of media identifiers in the third object array as media identifiers to be inserted and insert the media identifiers to be inserted into the two-dimensional array to obtain the media playback sequence, specifically including:

the number of empty arrays in the two-dimensional array is acquired to obtain an acquisition result, and a position object array for recording the positions of the empty arrays in the two-dimensional array is generated; and according to the acquisition result and the media playbacks time of each of the media identifiers to be inserted, the insertion positions of the media identifiers to be inserted in the two-dimensional array are calculated.

In still another aspect, a system for generating a media playback sequence provided in an embodiment of the present disclosure includes: a processor and a memory; wherein the memory stores instructions executed by the processor, and the instructions are executed by the processor to perform any one of the foregoing methods for generating a media playback sequence.

In another aspect, a media playback sequence generation system provided in an embodiment of the present disclosure includes: a server end and a browser end, wherein the browser end is connected to the server end by a web page link address to jointly execute any one of the foregoing methods for generating a media playback sequence.

In still another aspect, a computer readable storage medium provided in an embodiment of the present disclosure is a non-volatile memory and stores program codes, wherein the program codes are executed by one or more processors to implement any one of the foregoing methods for generating a media playback sequence.

BRIEF DESCRIPTION OF THE DRAWINGS

In order to illustrate the technical solutions of the embodiments of the present disclosure more clearly, accompanying drawings requiring to be used in the description of the embodiments will be briefly introduced. Obviously, the accompany drawings described below are only some embodiments of the present disclosure. For those of ordinary skill in the art, other accompany drawings are obtained according to these accompany drawings without any inventive effort.

FIG. 3 is a partial schematic diagram of a display interface of a playback list of the first embodiment of the present disclosure.

FIGS. 4A-4F are status schematic diagrams of inserting five media identifiers into a plurality of segments in the first embodiment of the present disclosure.

DETAILED DESCRIPTION OF THE EMBODIMENTS

Hereinafter, the technical solutions in the embodiments of the present disclosure will be clearly and completely described with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without any inventive effort shall all fall within the scope of protection of the present disclosure.

First Embodiment

Figure 1:
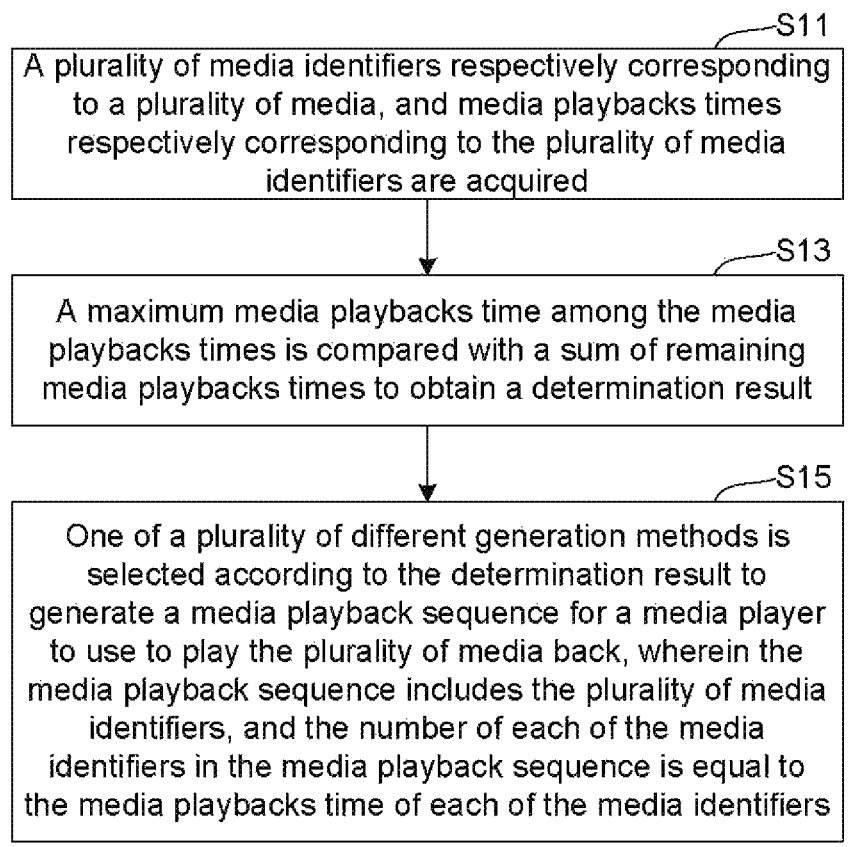
FIG. 1 is a flowchart of a method for generating a media playback sequence of a first embodiment of the present disclosure.

As shown in FIG. 1, a method for generating a media playback sequence provided in a first embodiment of the present disclosure includes, for example, the following steps:

S11: a plurality of media identifiers respectively corresponding to a plurality of media, and media playbacks times respectively corresponding to the plurality of media identifiers are acquired;

S13: a maximum media playbacks time among the media playbacks times is compared with a sum of remaining media playbacks times to obtain a determination result; and S15: one of a plurality of different generation methods is selected according to the determination result to generate a media playback sequence for a media player to use to play the plurality of media back, wherein the media playback sequence includes the plurality of media identifiers, and the number of each of the media identifiers in the media playback sequence is equal to the media playbacks time of each corresponding to the media identifiers.

Figure 2:
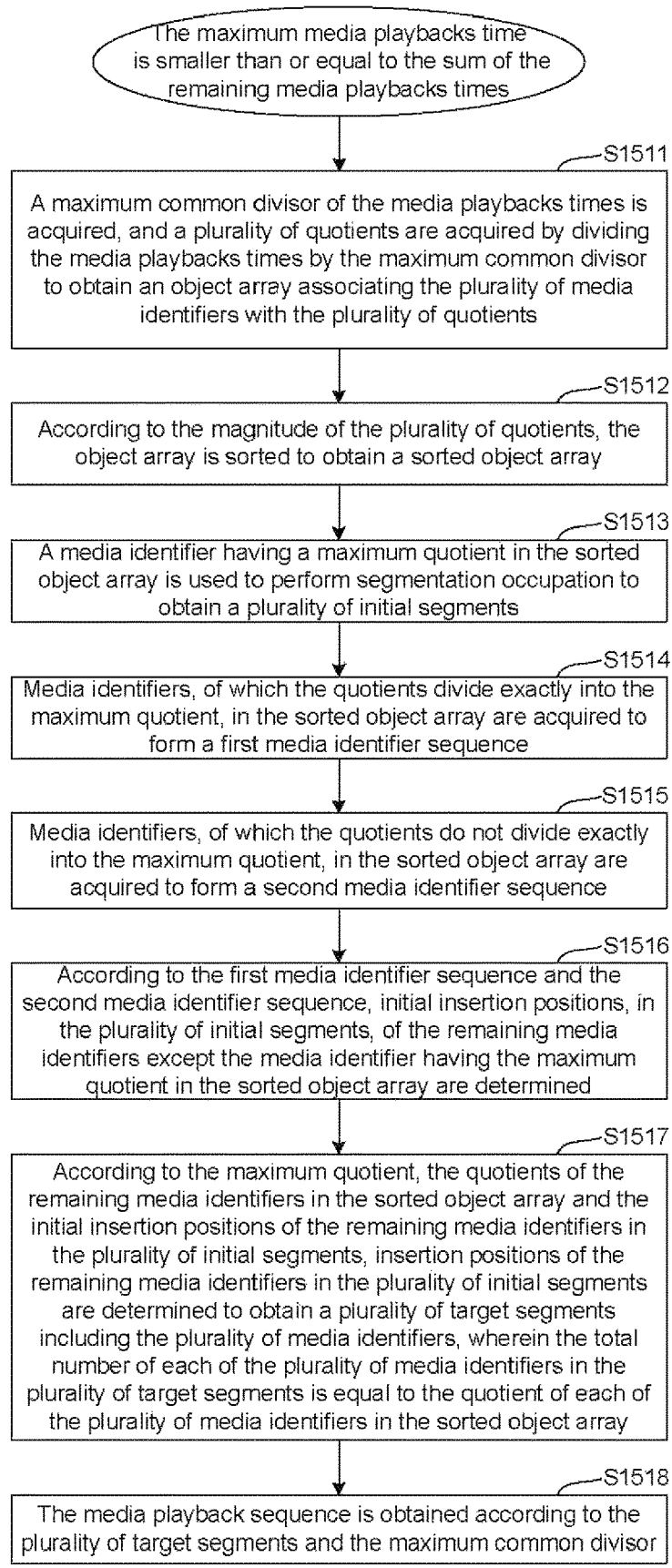
FIG. 2 is a flowchart of sub-steps of step S15 in FIG. 1.

With regard to step S15, on one hand, referring to FIG. 2, if the maximum media playbacks time is smaller than or equal to the sum of the remaining media playbacks times, sub-steps S1511-S1518 are performed to generate a media playback sequence, specifically include:

S1511: a maximum common divisor of the media playbacks times is acquired, and a plurality of quotients are acquired by dividing the media playbacks times by the maximum common divisor to obtain a first object array associating the plurality of media identifiers with the plurality of quotients;

S1512: according to the magnitude of the plurality of quotients, the first object array is sorted to obtain a sorted object array;

S1513: a media identifier having a maximum quotient in the sorted object array is used to perform segmentation occupation to obtain a plurality of initial segments;

S1514: media identifiers, of which the quotients divide exactly into the maximum quotient, in the sorted object array are acquired to form a first media identifier sequence;

S1515: media identifiers, of which the quotients do not divide exactly into the maximum quotient, in the sorted object array are acquired to form a second media identifier sequence;

S1516: according to the first media identifier sequence and the second media identifier sequence, initial insertion positions, in the plurality of initial segments, of the remaining media identifiers except the media identifier having the maximum quotient in the sorted object array are determined;

S1517: according to the maximum quotient, the quotients of the remaining media identifiers in the sorted object array and the initial insertion positions of the remaining media identifiers in the plurality of initial segments, insertion positions of the remaining media identifiers in the plurality of initial segments are determined to obtain a plurality of target segments including the plurality of media identifiers, wherein the total number of each of the plurality of media identifiers in the plurality of target segments is equal to the quotient of each of the plurality of media identifiers in the sorted object array; and S1518: the media playback sequence is obtained according to the plurality of target segments and the maximum common divisor.

For example, there is a playback list, such as the playback list presented on the display interface shown in FIG. 3, the playback list includes five pieces of media with media identifiers A, B, C, D, and E respectively, and the media playbacks time corresponding to the media identifiers A, B, C, D, and E is 4, 4, 8, 6, and 2 respectively. The five pieces of media are any combination of media such as video, picture, text, RSS information, etc.

First, step S11 is performed to acquire the media identifiers (A, B, C, D, E) of the media and corresponding media playbacks time (4, 4, 8, 6, 2) to obtain an initial object array PL={'A':4, 'B':4, 'C':8, 'D':6, 'E':2}.

Then, step S13 is performed, and as the maximum media playbacks time is 8 and the sum of the remaining media playbacks times is (4+4+6+2=16), and the determination result is that the maximum media playbacks time is smaller than the sum of the remaining media playbacks times, and then, sub-steps S1511-S1518 shown in FIG. 2 are performed to generate a media playback sequence, namely:

(x1) a maximum common divisor of the media playbacks time (4, 4, 8, 6, 2) in the initial object array PL is calculated, and then the media playbacks time corresponding to each of the media identifiers in the initial object array PL is divided by the maximum common divisor 2 to obtain a new object array newPL={'A':2, 'B':2, 'C':4, 'D':3, 'E':1};

(x2) according to the values of items in the new object array newPL, in a descending manner, the newPL is sorted to obtain a sorted object array arrPL={'C':4, 'D':3, 'A':2, 'B':2, 'E':1};

(x3) the media identifier C with the maximum value (Max=4) in the sorted object array arrPL is used to perform segmentation occupation to obtain a plurality of initial segments, for example, the four initial segments as shown in FIG. 4A;

(x4) media identifiers, of which the values divide exactly into the maximum value Max, in the sorted object array arrPL are acquired to form a media identifier sequence in a descending order: ABE;

(x5) media identifiers, of which the values do not divide exactly into the maximum value Max, in the sorted object array arrPL are acquired to form a media identifier sequence in a descending order: D;

(x6) from step (x4) and step (x5) above, the insertion order of each of the media identifiers in the four initial segments is sequentially inserting A B E D, and thus the initial insertion position of A is 0, the initial insertion position of B is 1, the initial insertion position of E is 2, and the initial insertion position of D is 3, and according to a formula Math·floor((Max/nowValue)*(n−1))+start, all the insertion positions of the media identifiers ABED are calculated one by one, wherein nowValue represents the number of the current media identifier, n is an integer and ranges from 1 to nowValue, start represents the initial insertion position of the current media identifier, and Math·floor is a round down function;

(x7) the interval parameter of A is Max/nowValue=4/2=2, and according to Math·floor(2*(n−1))+0, the insertion positions of A as 0 and 2 are calculated, as shown in FIG. 4B;

(x8) the interval parameter of B is Max/nowValue=4/2=2, and according to Math·floor(2*(n−1))1, the insertion positions of B as 1 and 3 are calculated, as shown in FIG. 4C;

(x9) the interval parameter of E is Max/nowValue=4/1=4, and according to Math·floor(4*(n−1))2, the insertion position of E as 2 is calculated, as shown in FIG. 4D;

(x10) the interval parameter of D is Max/nowValue=4/3≈1.3, and according to Math·floor(1.3*(n−1))+3, the insertion positions of D as 3, 4 and 5 are calculated; 4 and 5 in the insertion positions (index) of D satisfy the condition of being greater than or equal to Max, and thus according to a formula of index=index−Max, the final insertion positions of D are 3, 0 and 1, as shown in FIG. 4E; so far, a round of uniform media sequence is generated; and (x11) as the maximum common divisor is 2, two rounds need to be traversed, the finally generated media playback sequence shown in FIG. 4F.

As described above, on the other hand, referring to FIG. 5, if the maximum media playbacks time is greater than the sum of the remaining media playbacks times, sub-step S1530 is performed to determine whether the number of the plurality of media identifiers is equal to 2 and the minimum media playbacks time among the media playbacks times is 1. If the determination result in the sub-step S1530 is "yes", sub-steps S1531-S1534 are performed to generate a media playback sequence, specifically include:

S1531: a second object array associating the plurality of media identifiers with the media playbacks times is generated;

S1532: a sum of the media playbacks times is calculated, and a plurality of segments is generated, the number of which is equal to the sum;

S1533: a quotient obtained by dividing the sum by 2 is rounded down to determine a target position, in the plurality of segments, of the media identifier having the minimum media playbacks time; and S1534: the media identifier having the minimum media playbacks time is inserted into a target segment, corresponding to the target position in the plurality of segments, and remaining media identifiers in the plurality of media identifiers are inserted into the remaining segments, except the target segment, in the plurality of segments to obtain the media playback sequence.

For example, there is a playback list which has only two pieces of media and the minimum media playbacks time is 1, for example, two pieces of media with media identifiers A and B respectively are included, and the media playbacks times corresponding to the two media identifiers A and B are 6 and 1 respectively. The two pieces of media are any combination of media such as video, picture, text, RSS information, etc.

First, step S11 is performed to acquire the media identifiers (A, B) of the media and corresponding media playbacks times (6, 1) to obtain an initial object array PL={'A':6, 'B':1}.

Figure 5:
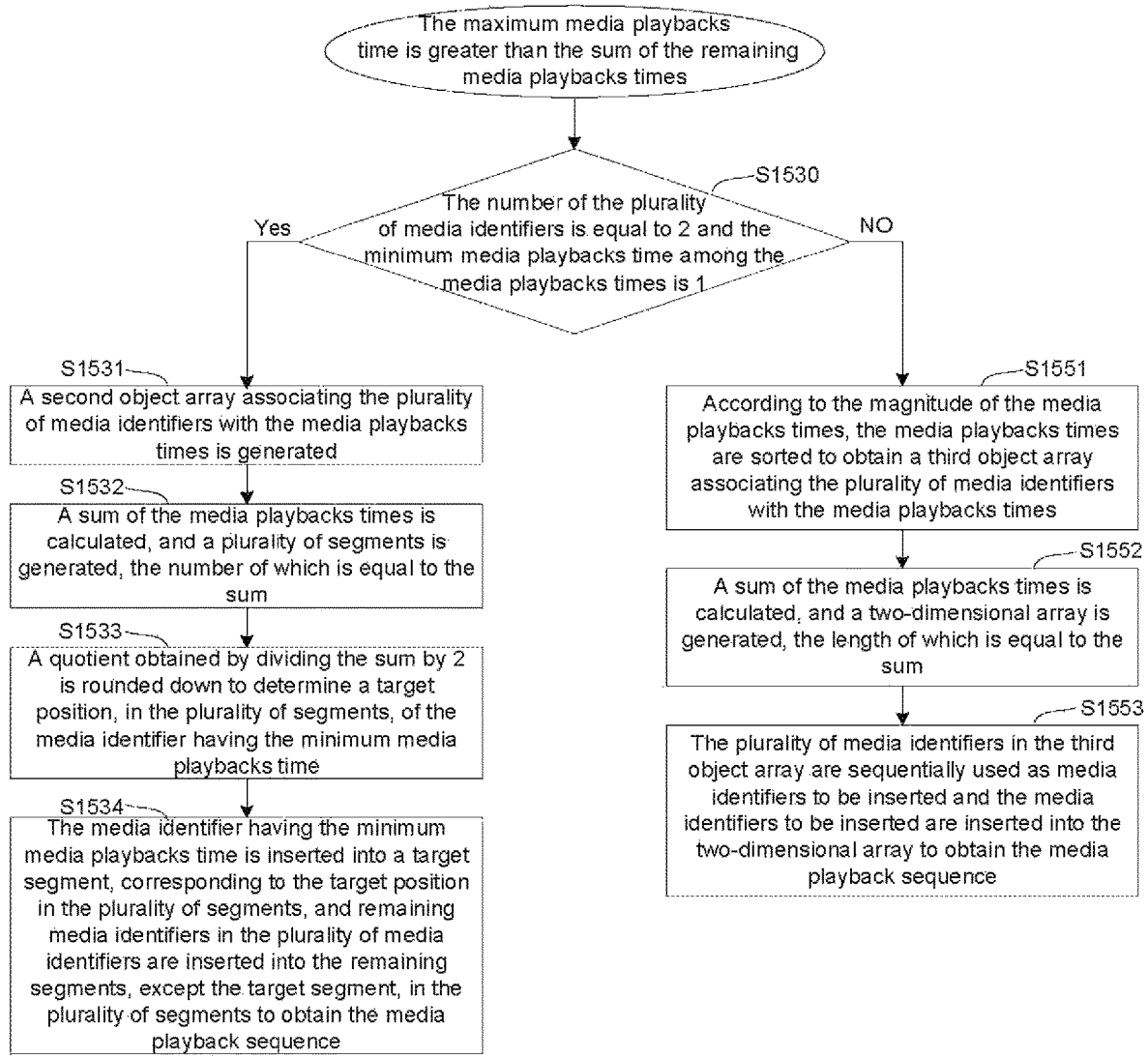
FIG. 5 is a flowchart of other sub-steps of step S15 in FIG. 1.
Figure 6A:
FIGS. 6A-6B are status schematic diagrams of inserting two media identifiers into a plurality of segments in the first embodiment of the present disclosure.
Figure 6B:

Then, step S13 is performed, and the maximum media playbacks time is 6 and the sum of the remaining media playbacks times is 1, and thus the obtained determination result is that the maximum media playbacks time is greater than the sum of the remaining media playbacks times and the conditions that "the number of the plurality of media identifiers is equal to 2 and the minimum media playbacks time among the media playbacks times is 1" are satisfied, then sub-steps S1531-S1534 shown in FIG. 5 are performed to generate a media playback sequence, namely:

(y1) according to the media playbacks time of each of the media identifiers, the initial object array PL is processed in a descending order to obtain a new object array newPL={'A':6, 'B':1} (corresponding to the second object array);

(y2) a sum, i.e., total=(6+1)=7, of the media playbacks time of each of the media identifiers is calculated, and a plurality of segments is generated, the number of which is equal to the sum, i.e., total, as shown in FIG. 6A;

(y3) an intermediate position is calculated according to a formula Math·floor(total/2), as a target position of the media identifier B having the minimum media playbacks time, i.e. 1, in the plurality of segments as shown in FIG. 6A; and (y4) the media identifier B with the minimum media playbacks time 1 is inserted into the segment corresponding to the target position obtained in step (y3), other segments in FIG. 6A are filled with the media identifier A, and finally a uniformly sorted media playback sequence is generated, as shown in FIG. 6B.

Moreover, in FIG. 5, if the determination result of the sub-step S1530 is "no", sub-steps S1551-S1553 are performed to generate a media playback sequence, specifically includes:

S1551: according to the magnitude of the media playbacks times, the media playbacks times are sorted to obtain a third object array associating the plurality of media identifiers with the media playbacks times;

S1552: a sum of the media playbacks times is calculated, and a two-dimensional array is generated, the length of which is equal to the sum; and S1553: the plurality of media identifiers in the third object array are sequentially used as media identifiers to be inserted and the media identifiers to be inserted are inserted into the two-dimensional array to obtain the media playback sequence, specifically including: (a) the number of empty arrays in the two-dimensional array is acquired to obtain an acquisition result, and a position object array for recording the positions of the empty arrays in the two-dimensional array is generated; and (b) according to the acquisition result and the media playbacks time of each of the media identifiers to be inserted, the insertion positions of the media identifiers to be inserted in the two-dimensional array are calculated.

For example, there is a playback list which includes, for example, three pieces of media with media identifiers A B, and C respectively, and the media playbacks times corresponding to the three media identifiers A, B, and C are 6, 1, and 2 respectively. The three pieces of media are any combination of media such as video, picture, text, RSS information, etc.

First, step S11 is performed to acquire the media identifiers (A, B, C) of the media and corresponding media playbacks time (6, 1, 2) to obtain an initial object array PL={'A':6, 'B':1, 'C':2}.

Figure 7A:
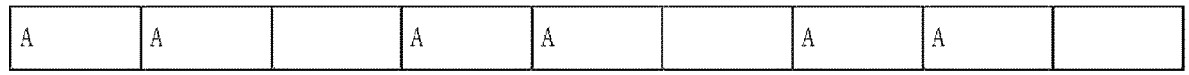
FIGS. 7A-7O are status schematic diagrams of inserting three media identifiers into a plurality of segments in the first embodiment of the present disclosure.
Figure 7B:
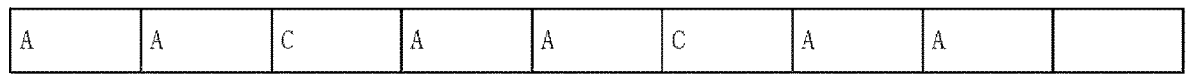
Figure 7C:
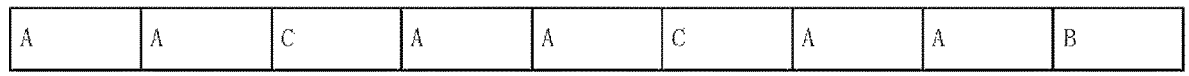

Then, step S13 is performed, and the maximum media playbacks time is 6 and the sum of the remaining media playbacks times is (1+2)=3, and thus the determination result is that the maximum media playbacks time is greater than the sum of the remaining media playbacks times, and the conditions that "the number of the plurality of media identifiers is equal to 2 and the minimum media playbacks time among the media playbacks times is 1" are not satisfied, then sub-steps S1551-S1553 shown in FIG. 5 are performed to generate a media playback sequence, namely:

(z1) according to the media playbacks time of each of the media identifiers, the initial object array FL is processed in a descending order to obtain a new object array newPL={A: 6, C:2, B:1} (corresponding to the third object array);

(z2) a sum, i.e. total=(6+2+1)=9, of the media playbacks time of each of the media identifiers is calculated, and a two-dimensional array with a length of 9 is generated, for example, arrArr={[ ], [ ], [ ], [ ], [ ], [ ], [ ], [ ], [ ]};

(z3) the number of empty arrays, i.e. nullTotal in the two-dimensional array is calculated, and a position object array arrObj={0:0, 1:1, 2:2, 3:3, 4:4, 5:5, 6:6, 7:7, 8:8} for recording the positions of the empty arrays in the two-dimensional array arrArr is generated;

(z4) a formula Math·floor(nullTotal/count*i) is used, wherein count represents the media playbacks time of the current media identifier, i is an integer and ranges from 0 to count;

(z5) according to step (z4), the insertion positions of A in the two-dimensional array are 0, 1, 3, 4, 6 and 7, as shown in FIG. 7A;

(z6) step (z3) and step (z4) are performed again, and the position object array is changed to arrObj={0:2, 1:5, 2:8}, thereby obtaining that the insertion positions of C in the two-dimensional array are 2 and 5, as shown in FIG. 7B; and (z7) step (z3) and step (z4) are performed again, the position object array is changed to arrObj={0:8}, thereby obtaining that the insertion position of B in the two-dimensional array is 8, for example, as shown in FIG. 7C, thereby generating a uniformly sorted media playback sequence. That is, steps (z3) and (z4) are performed cyclically until the insertion positions of all the media identifiers are determined.

In conclusion, the present embodiment is applied to the playback of list media advertisements, by adopting the uniform sorting method of the present embodiment, a uniformly distributed media playback sequence can be obtained for playback, thereby solving the pain problem that media advertisements cannot be uniformly played back in industrial products; moreover, the uniform sorting method in this embodiment is not limited to the playback of list media advertisements, and can also be applied to other similar scenarios.

Second Embodiment

Figure 8A:
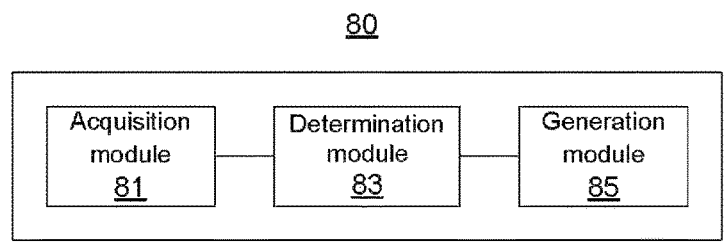
FIG. 8A is a module schematic diagram of a device for generating a media playback sequence according to a second embodiment of the present disclosure.
Figure 8B:
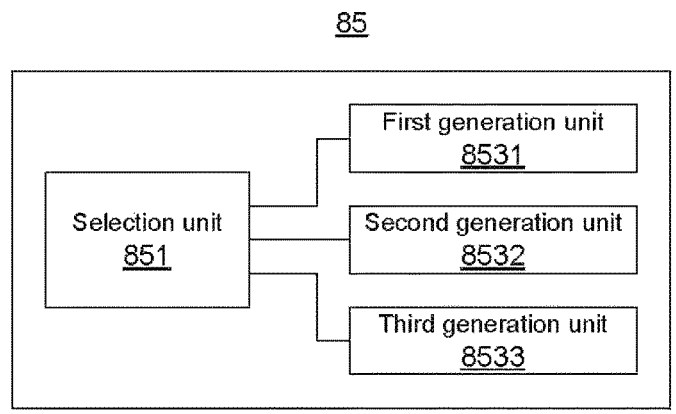
FIG. 8B is a unit schematic diagram of a generation module in FIG. 8A.

As shown in FIG. 8A, a device 80 for generating a media playback sequence provided in a second embodiment of the present disclosure includes: an acquisition module 81, a determination module 83 and a generation module 85.

The acquisition module 81 is for example, configured to acquire a plurality of media identifiers respectively corresponding to a plurality of media, and media playbacks times respectively corresponding to the plurality of media identifiers; the determination module 83 is for example, configured to compare a maximum media playbacks time among the media playbacks times with a sum of remaining media playbacks times to obtain a determination result; and the generation module 85 is, for example, configured to select, according to the determination result, one of a plurality of different generation methods to generate a media playback sequence for a media player to use to play the plurality of media back, wherein the media playback sequence includes the plurality of media identifiers, and the number of each of the media identifiers in the media playback sequence is equal to the media playbacks time corresponding to each of the media identifiers.

For specific functional details of the acquisition module 81, the determination module 83, and the generation module 85, reference can be made to related descriptions of steps S11, S13, and S15 in the first embodiment above, and the details will not be repeated herein again. In addition, it is worth mentioning that the acquisition module 81, the determination module 83 and the generation module 85 can be software modules, which are stored in a non-volatile memory and are executed by a processor to perform steps S11, S13 and S15 in the described first embodiment.

Referring to FIG. 88, the generation module 85 in this embodiment includes, for example, a selection unit 851 and a plurality of generation units such as a first generation unit 8531, a second generation unit 8532, and a third generation unit 8533.

The selection unit 851 is, for example, configured to select one of the plurality of generation units 8531-8533 according to the determination result to generate the media playback sequence.

The first generation unit 8531 is, for example, configured to (i) acquire a maximum common divisor of the media playbacks times, and acquire a plurality of quotients by dividing the media playbacks times by the maximum common divisor to obtain a first object array associating the plurality of media identifiers with the plurality of quotients; (ii) sort the first object array according to the magnitude of the plurality of quotients to, obtain a sorted object array; (iii) use a media identifier having a maximum quotient in the sorted object array to perform segmentation occupation to obtain a plurality of initial segments; (iv) acquire media identifiers, of which the quotients divide exactly into the maximum quotient, in the sorted object array to form a first media identifier sequence; (v) acquire media identifiers, of which the quotients do not divide exactly into the maximum quotient, in the sorted object array to form a second media identifier sequence; (vi) according to the first media identifier sequence and the second media identifier sequence, determine initial insertion positions, in the plurality of initial segments, of the remaining media identifiers except the media identifier with the maximum quotient in the sorted object array; (vii) according to the maximum quotient, the quotients of the remaining media identifiers in the sorted object array and the initial insertion positions of the remaining media identifiers in the plurality of initial segments, determine insertion positions of the remaining media identifiers in the plurality of initial segments to obtain a plurality of target segments including the plurality of media identifiers, wherein the total number of each of the plurality of media identifiers in the plurality of target segments is equal to the quotient of each of the plurality of media identifiers in the sorted object array; and (viii) obtain the media playback sequence according to the plurality of target segments and the maximum common divisor.

The second generation unit 8532 is, for example, configured to (a) generate a second object array associating the plurality of media identifiers with the media playbacks times; (b) calculate a sum of the media playbacks times, and generate a plurality of segments, the number of which is equal to the sum; (c) round down a quotient obtained by dividing the sum by 2 to determine a target position, in the plurality of segments, of the media identifier having the minimum media playbacks time; and (d) insert the media identifier having the minimum media playbacks time into a target segment, corresponding to the target position, in the plurality of segments, and insert remaining media identifiers in the plurality of media identifiers into the remaining segments, except the target segment, in the plurality of segments to obtain the media playback sequence.

The third generation unit 8533 is, for example, configured to (1) sort the media playbacks times according to the magnitude of the media playbacks times to obtain a third object array associating the plurality of media identifiers with the media playbacks times; (2) calculate a sum of the media playbacks times, and generate a two-dimensional array, the length of which is equal to the sum; and (3) sequentially use the plurality of media identifiers in the third object array as media identifiers to be inserted and insert the media identifiers to be inserted into the two-dimensional array to obtain the media playback sequence, specifically including: the number of empty arrays in the two-dimensional array is acquired to obtain an acquisition result, and a position object array for recording the positions of the empty arrays in the two-dimensional array is generated; and according to the acquisition result and the media playbacks time of the media identifiers to be inserted, the insertion positions of the media identifiers to be inserted in the two-dimensional array are calculated.

For specific functional details of the selection unit 851, the first generation unit 8531, the second generation unit 8532, and the third generation unit 8533, reference can be made to related descriptions of the sub-steps S1511-S1518, S1531-S1534, and S1551-S1553 regarding step S15 in the first embodiment above, and the details will not be repeated herein again. Furthermore, it is worth mentioning that the selection unit 851, the first generation unit 8531, the second generation unit 8532 and the third generation unit 8533 may be software modules, which are stored in a non-volatile memory and are executed by a processor to perform relevant operations to perform sub-steps S1511-S1518, S1531-S1534 and S1551-S1553 regarding step S15 in the first embodiment above.

In conclusion, the present embodiment is applied to the playback of list media advertisements, by adopting the uniform sorting method performed by the device 80 for generating a media playback sequence of the present embodiment, a uniformly distributed media playback sequence can be obtained for playback, thereby solving the pain problem that media advertisements cannot be uniformly played back in industrial products; moreover, the uniform sorting method performed in this embodiment is not limited to the playback of list media advertisements, and can also be applied to other similar scenarios.

Third Embodiment

Figure 9:
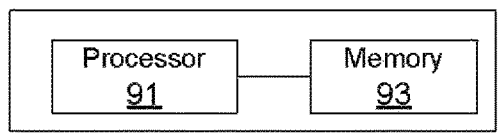
FIG. 9 is a structure schematic diagram of a system for generating a media playback sequence according to a third embodiment of the present disclosure.

As shown in FIG. 9, a system 90 for generating a media playback sequence provided in a third embodiment of the present disclosure includes: a processor 91 and a memory 93; the memory 93 stores instructions executed by the processor 91, and the instructions, for example, are executed by the processor 91 to perform the method described for generating a media playback sequence in the first embodiment above.

Fourth Embodiment

Figure 10:
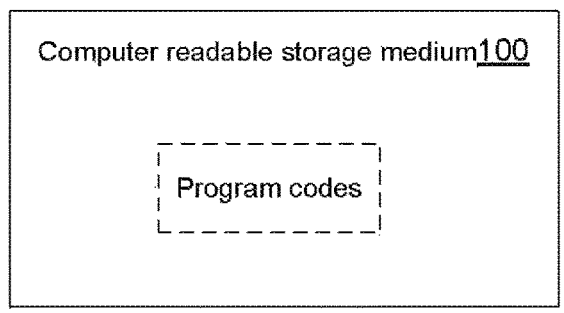
FIG. 10 is a schematic diagram of a computer readable storage medium according to a fourth embodiment of the present disclosure.

As shown in FIG. 10, a computer readable storage medium 100 provided in a fourth embodiment of the present disclosure is a non-volatile memory and stores program codes, wherein the program codes are executed by one or more processors to implement the method for generating a media playback sequence described in the first embodiment above.

Fifth Embodiment

Figure 11:
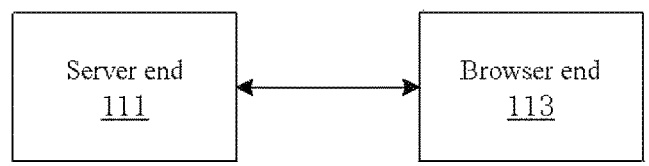
FIG. 11 is a structure schematic diagram of a system for generating a media playback sequence according to a fifth embodiment of the present disclosure.
Figure 12:
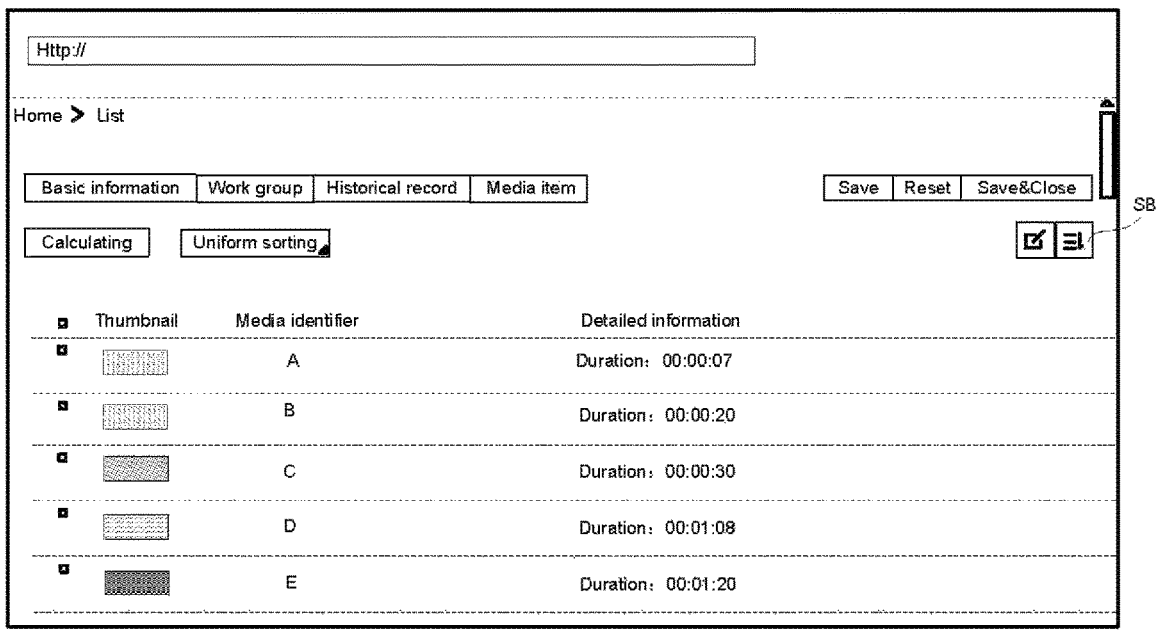
FIG. 12 is a schematic diagram of a display interface of a media playback sequence according to the fifth embodiment of the present disclosure.

As shown in FIG. 11, a system 110 for generating a media playback sequence according to a fifth embodiment of the present disclosure includes: a server end 111 and a browser end 113. The browser end 113 is connected to the server end 111 by a web page link address to jointly execute the method for generating a media playback sequence according to the first embodiment above. The browser end 113 is, for example, a computer installed with a browser, and can download a playback list from the server end 111 for display (as shown in FIG. 3), and can also be used by a user to perform operations such as adding, modifying and deleting on the playback list and store the playback list to the server end 111. Moreover, as shown in FIG. 12, after the browser end 113 connects to the server end 111 by a web page link address, the user can click a sort button SB and select an option of [uniform sorting], and then a method for generating a media playback sequence can be executed, for example, the media playback sequence can be generated according to the playback list shown in FIG. 3 and displayed in the display interface shown in FIG. 12.

In addition, it should be understood that the foregoing embodiments are merely exemplary descriptions of the present invention, and the technical solutions of the embodiments can be combined in any one and used together under the premise that the technical features are not conflicted and the structures are not contradictory and the objective of the present invention is not violated.

In the several embodiments provided in the present disclosure, it should be understood that the disclosed system, device, and/or method can be implemented in other ways. For example, the device embodiment described above is merely exemplary. For example, the division of units/modules is merely a logical functional division, and there may be other division manners in actual implementation. For example, a multi-unit unit or module may be combined or integrated into another system, or some features can be ignored or not executed. In addition, the displayed or discussed mutual couplings or direct couplings or communication connections may be implemented through some interfaces. The indirect couplings or communication connections between the devices or units may be implemented in electronic, mechanical, or other forms.

The units/modules described as separate parts may or may not be physically separated, and parts displayed as units/modules may or may not be physical units, may be located in one position, or may be distributed on multiple network units. A part or all of the units/modules may be selected according to actual needs to achieve the objectives of the solutions of the embodiments.

In addition, functional units/modules in the embodiments of the present disclosure may be integrated into one processing unit/module, or the units/modules may exist alone physically, or two or more units/modules are integrated into one unit/module. The integrated units/modules above may be implemented in a form of hardware, or may be implemented in a form of hardware and a software functional units/modules.

The integrated units/modules implemented in the form of software functional units/modules may be stored in a computer readable storage medium. The software functional units above may be stored in a storage medium and include several instructions which are used to enable one or more processors of a computer device (may be a personal computer, a server or a network device, etc.) to execute some of the steps of the methods described in the embodiments of the disclosure. The storage medium above includes; any medium that can store program codes, such as a USB flash disk, a removable hard disk, a Read-Only Memory (ROM), a Random Access Memory (RAM), a magnetic disk, or an optical disk.

Finally, it should be noted that the embodiments above are only used to explain the technical solutions of the present disclosure, rather than limit same. Although the present disclosure has been explained in detail with reference to the embodiments above, it should be understood that a person of ordinary skill in the art would still modify the technical solutions disclosed in the embodiments described above or make equivalent replacements to some of the technical features therein. However, these modifications or replacements shall not render that the nature of the corresponding technical solutions departs from the spirit and scope of the technical solutions in the embodiments of the present disclosure.

What is claimed is:

1. A method for generating a media playback sequence, comprising:

Acquiring, by a server, a plurality of media identifiers respectively corresponding to a plurality of media, and media playbacks times respectively corresponding to the plurality of media identifiers;

comparing, by the server, a maximum media playbacks time among the media playbacks times with a sum of remaining media playbacks times to obtain a determination result, wherein the remaining media playbacks times is the media playbacks times except the maximum media playbacks time among the media playbacks times; and selecting, by the server, one of a plurality of different generation methods according to the determination result to generate a media playback sequence for a media player to use to play the plurality of media back, wherein the media playback sequence comprises the plurality of media identifiers, the number of each of the media identifiers in the media playback sequence is equal to the media playbacks time corresponding to each of the media identifiers, and the media player connects to the server through the network.

2. The method for generating the media playback sequence according to claim 1, wherein selecting one of the plurality of different generation methods according to the determination result to generate the media playback sequence for the media player to use to play the plurality of media back comprises:

if the determination result is that the maximum media playbacks time is smaller than or equal to the sum of the remaining media playbacks times, selecting a first generation method from the plurality of different generation methods to generate the media playback sequence.

3. The method for generating the media playback sequence according to claim 2, wherein the first generation method comprises:

acquiring a maximum common divisor of the media playbacks times, and acquiring a plurality of quotients by dividing the media playbacks times by the maximum common divisor respectively to obtain a first object array associating the plurality of media identifiers with the plurality of quotients;

sorting the first object array according to the magnitude of the plurality of quotients to obtain a sorted object array;

using a media identifier having a maximum quotient in the sorted object array to perform segmentation occupation to obtain a plurality of initial segments;

acquiring media identifiers, of which the quotients divide exactly into the maximum quotient, in the sorted object array to form a first media identifier sequence;

acquiring media identifiers, of which the quotients do not divide exactly into the maximum quotient, in the sorted object array to form a second media identifier sequence;

according to the first media identifier sequence and the second media identifier sequence, determining initial insertion positions, in the plurality of initial segments, of the remaining media identifiers except the media identifier having the maximum quotient in the sorted object array;

according to the maximum quotient, the quotients of the remaining media identifiers in the sorted object array and the initial insertion positions of the remaining media identifiers in the plurality of initial segments, determining insertion positions of the remaining media identifiers in the plurality of initial segments to obtain a plurality of target segments comprising the plurality of media identifiers, wherein the total number of each of the plurality of media identifiers in the plurality of target segments is equal to the quotient of each of the plurality of media identifiers in the sorted object array; and obtaining the media playback sequence according to the plurality of target segments and the maximum common divisor.

4. The method for generating the media playback sequence according to claim 1, wherein selecting one of the plurality of different generation methods according to the determination result to generate the media playback sequence for the media player to use to play the plurality of media back comprises:

if the determination result is that the maximum media playbacks time is greater than the sum of the remaining media playbacks times and conditions are satisfied, selecting a second generation method from the plurality of different generation methods to generate the media playback sequence.

5. The method for generating the media playback sequence according to claim 4, wherein the conditions are the number of the plurality of media identifiers is equal to 2 and a minimum media playbacks time among the media playbacks times is 1.

6. The method for generating the media playback sequence according to claim 5, wherein the second generation method comprises:

generating a second object array associating the plurality of media identifiers with the media playbacks times;

calculating a sum of the media playbacks times, and generating a plurality of segments, the number of which is equal to the sum;

rounding down a quotient obtained by dividing the sum by 2 to determine a target position in the plurality of segments, of the media identifier having the minimum media playbacks time; and inserting the media identifier having the minimum media playbacks time into a target segment, corresponding to the target position in the plurality of segments, and inserting remaining media identifiers in the plurality of media identifiers into the remaining segments, except the target segment in the plurality of segments to obtain the media playback sequence.

7. The method for generating the media playback sequence according to claim 1, wherein selecting one of the plurality of different generation methods according to the determination result to generate the media playback sequence for the media player to use to play the plurality of media back comprises:

if the determination result is that the maximum media playbacks time is greater than the sum of the remaining media playbacks times and the conditions are not satisfied, selecting a third generation method from the plurality of different generation methods to generate the media playback sequence.

8. The method for generating the media playback sequence according to claim 7, wherein the conditions are the number of the plurality of media identifiers is equal to 2 and the minimum media playbacks time among the media playbacks times is 1.

9. The method for generating the media playback sequence according to claim 8, wherein the third generation method comprises:

sorting the media playbacks times according to the magnitude of the media playbacks times to obtain a third object array associating the plurality of media identifiers and the media playbacks times;

calculating a sum of the media playbacks times, and generating a two-dimensional array, the length of which is equal to the sum; and sequentially using the plurality of media identifiers in the third object array as media identifiers to be inserted and inserting the media identifiers to be inserted into the two-dimensional array to obtain the media playback sequence.

10. The method for generating the media playback sequence according to claim 9, wherein sequentially using the plurality of media identifiers in the third object array as media identifiers to be inserted and inserting the media identifiers to be inserted into the two-dimensional array comprising:

acquiring the number of empty arrays in the two-dimensional array to obtain an acquisition result, and generating a position object array for recording the positions of the empty arrays in the two-dimensional array; and according to the acquisition result and the media playbacks time of each of the media identifiers to be inserted, calculating the insertion positions of the media identifiers to be inserted in the two-dimensional array.

11. A system for generating a media playback sequence, comprising: a processor and a memory; wherein the memory stores instructions executed by the processor, and the instructions are executed by the processor to perform the method for generating the media playback sequence according to claim 1.

12. A device for generating a media playback sequence, comprising:

an acquisition module, configured to acquire a plurality of media identifiers corresponding to a plurality of media, and media playbacks times respectively corresponding to the plurality of media identifiers;

a determination module, configured to comparing a maximum media playbacks time among the media playbacks times with a sum of remaining media playbacks times to obtain a determination result, wherein the remaining media playbacks times is the media playbacks times except the maximum media playbacks time among the media playbacks times; and a generation module, configured to select, according to the determination result, one of a plurality of different generation methods to generate a media playback sequence for a media player to use to play the plurality of media back, wherein the media playback sequence comprises the plurality of media identifiers, and the number of each of the media identifiers in the media playback sequence is equal to the media playbacks time corresponding to each of the media identifiers.

13. The device for generating the media playback sequence according to claim 12, wherein the generation module comprises a plurality of generation units and a selection unit, wherein the plurality of generation units are configured to provide the plurality of different generation methods respectively, and the selection unit is configured to select one of the plurality of generation units according to the determination result to generate the media playback sequence.

14. The device for generating the media playback sequence according to claim 13, wherein the plurality of generation units comprise a first generation unit, and the first generation unit is configured to:
acquire a maximum common divisor of the media playbacks times, and acquire a plurality of quotients by dividing the media playbacks times by the maximum common divisor respectively to obtain a first object array associating the plurality of media identifiers with the plurality of quotients;
sort the first object array according to the magnitude of the plurality of quotients to obtain a sorted object array;
use a media identifier having a maximum quotient in the sorted object array to perform segmentation occupation to obtain a plurality of initial segments;
acquire media identifiers in the sorted object array, of which the quotients divide exactly into the maximum quotient, so as to form a first media identifier sequence;
acquire media identifiers in the sorted object array, of which the quotients do not divide exactly into the maximum quotient, so as to form a second media identifier sequence;
according to the first media identifier sequence and the second media identifier sequence, determine initial insertion positions, in the plurality of initial segments, of the remaining media identifiers except the media identifier having the maximum quotient in the sorted object array;
according to the maximum quotient, the quotients of the remaining media identifiers in the sorted object array and the initial insertion positions of the remaining media identifiers in the plurality of initial segments, determine the insertion positions of the remaining media identifiers in the plurality of initial segments to obtain a plurality of target segments comprising the plurality of media identifiers, wherein the total number of each of the plurality of media identifiers in the plurality of target segments is equal to the quotient of each of the plurality of media identifiers in the sorted object array; and
obtain the media playback sequence according to the plurality of target segments and the maximum common divisor.

15. The device for generating the media playback sequence according to claim 14, wherein the plurality of generation units further include a second generation unit, and the second generation unit is configured to:
generate a second object array associating the plurality of media identifiers with the media playbacks times;
calculate a sum of the media playbacks times, and generate a plurality of segments, the number of which is equal to the sum;
round down a quotient obtained by dividing the sum by 2 to determine a target position in the plurality of segments, of the media identifier having the minimum media playbacks time; and
insert the media identifier having the minimum media playbacks time into a target segment, corresponding to the target position in the plurality of segments, and insert remaining media identifiers in the plurality of media identifiers into the remaining segments, except the target segment in the plurality of segments to obtain the media playback sequence.

16. The method for generating the media playback sequence according to claim 15, wherein the third generation unit is further configured to:
acquire the number of empty arrays in the two-dimensional array to obtain an acquisition result, and generate a position object array for recording the positions of the empty arrays in the two-dimensional array; and
according to the acquisition result and the media playbacks time of each of the media identifiers to be inserted, calculate the insertion positions of the media identifiers to be inserted in the two-dimensional array.

17. The device for generating the media playback sequence according to claim 15, wherein the plurality of generation units further include a third generation unit, and the third generation unit is configured to:
sort the media playbacks times according to the magnitude of the media playbacks times to obtain a third object array associating the plurality of media identifiers and the media playbacks times;
calculate a sum of the media playbacks times, and generate a two-dimensional array, the length of which is equal to the sum; and
sequentially use the plurality of media identifiers in the third object array as media identifiers to be inserted and insert the media identifiers to be inserted into the two-dimensional array to obtain the media playback sequence.

\* \* \* \* \*